United States Patent
Hansen et al.

(10) Patent No.: US 7,422,425 B2
(45) Date of Patent: Sep. 9, 2008

(54) DRIVE SYSTEM FOR A KNOCKOUT APPARATUS FOR A PATTY-FORMING MACHINE

(75) Inventors: David Hansen, Orland Park, IL (US); Timothy W. Ring, Schererville, IN (US)

(73) Assignee: Formax, Inc., Mokena, IL (US)

( * ) Notice: Subject to any disclaimer, the term of this patent is extended or adjusted under 35 U.S.C. 154(b) by 144 days.

(21) Appl. No.: 10/943,809

(22) Filed: Sep. 16, 2004

(65) Prior Publication Data

US 2005/0095309 A1 May 5, 2005

Related U.S. Application Data

(60) Provisional application No. 60/515,585, filed on Oct. 29, 2003, provisional application No. 60/503,354, filed on Sep. 16, 2003.

(51) Int. Cl.
*A22C 7/00* (2006.01)

(52) U.S. Cl. ............... 425/556; 425/574; 425/585; 425/588; 426/512; 426/513

(58) Field of Classification Search ............... 425/556, 425/574, 585, 588; 426/512, 513; *A22C 7/00*
See application file for complete search history.

(56) References Cited

U.S. PATENT DOCUMENTS

| | | | |
|---|---|---|---|
| 3,747,160 A | 7/1973 | Holly et al. |
| 3,952,478 A | 4/1976 | Richards et al. |
| 4,054,967 A | 10/1977 | Sandberg et al. |
| RE30,096 E | 9/1979 | Richards |
| 4,182,003 A | 1/1980 | Lamartino et al. |
| 4,356,595 A | 11/1982 | Sandberg et al. |
| 4,372,008 A | 2/1983 | Sandberg |
| 4,516,291 A | 5/1985 | Goldberger et al. |
| 4,697,308 A | 10/1987 | Sandberg |
| 4,767,305 A * | 8/1988 | Tashiro ............... 425/308 |

(Continued)

FOREIGN PATENT DOCUMENTS

WO    WO 01/41575    6/2001

(Continued)

OTHER PUBLICATIONS

Adjustment—Stroke Position Illustration 8, F-26C Manual, 1997, 1 page, Formax, Inc.

*Primary Examiner*—Yogendra Gupta
*Assistant Examiner*—Maria Veronica D Ewald
(74) *Attorney, Agent, or Firm*—The Law Office of Randall T. Erickson, P.C.

(57) ABSTRACT

A knockout drive system for a food patty molding machine includes an electric motor; a rotary-to-linear motion converting apparatus operatively connected to the electric motor; and at least one knockout member operatively connected between the rotary-to-linear motion converting apparatus and the knockout plungers, to reciprocate the knockout plungers. The mold plate and knockout plungers are not mechanically linked to be driven together but are independently driven. The electric motor of the knockout drive system is a servo driven motor wherein the speed, acceleration, deceleration and dwell periods of the knockout plungers can be precisely controlled to be synchronized with the mold plate movements and positions, and for the type of food product, the output rate and the shape of the patties.

38 Claims, 17 Drawing Sheets

U.S. PATENT DOCUMENTS

| | | |
|---|---|---|
| 4,768,260 A | 9/1988 | Sandberg |
| 4,768,325 A | 9/1988 | Lindee et al. |
| 4,821,376 A | 4/1989 | Sandberg |
| 4,872,241 A | 10/1989 | Lindee |
| 4,996,743 A | 3/1991 | Janssen |
| 5,655,436 A | 8/1997 | Soper |
| 5,730,650 A | 3/1998 | Soper |
| 5,980,228 A | 11/1999 | Soper |
| 6,156,358 A | 12/2000 | Soper |
| 6,238,196 B1 * | 5/2001 | Hyllstam et al. ............ 425/139 |
| 6,368,092 B1 | 4/2002 | Lindee et al. |
| 6,428,303 B2 * | 8/2002 | Lindee et al. ............... 425/215 |
| 6,454,559 B1 | 9/2002 | Lindee |
| 6,517,340 B2 | 2/2003 | Sandberg |
| 6,572,360 B1 | 6/2003 | Buhlke et al. |
| 6,745,679 B2 | 6/2004 | Nakamura et al. |
| 2003/0034225 A1 * | 2/2003 | Sandberg et al. ......... 198/460.2 |

FOREIGN PATENT DOCUMENTS

| | | |
|---|---|---|
| WO | WO 02/102166 | 12/2002 |

* cited by examiner

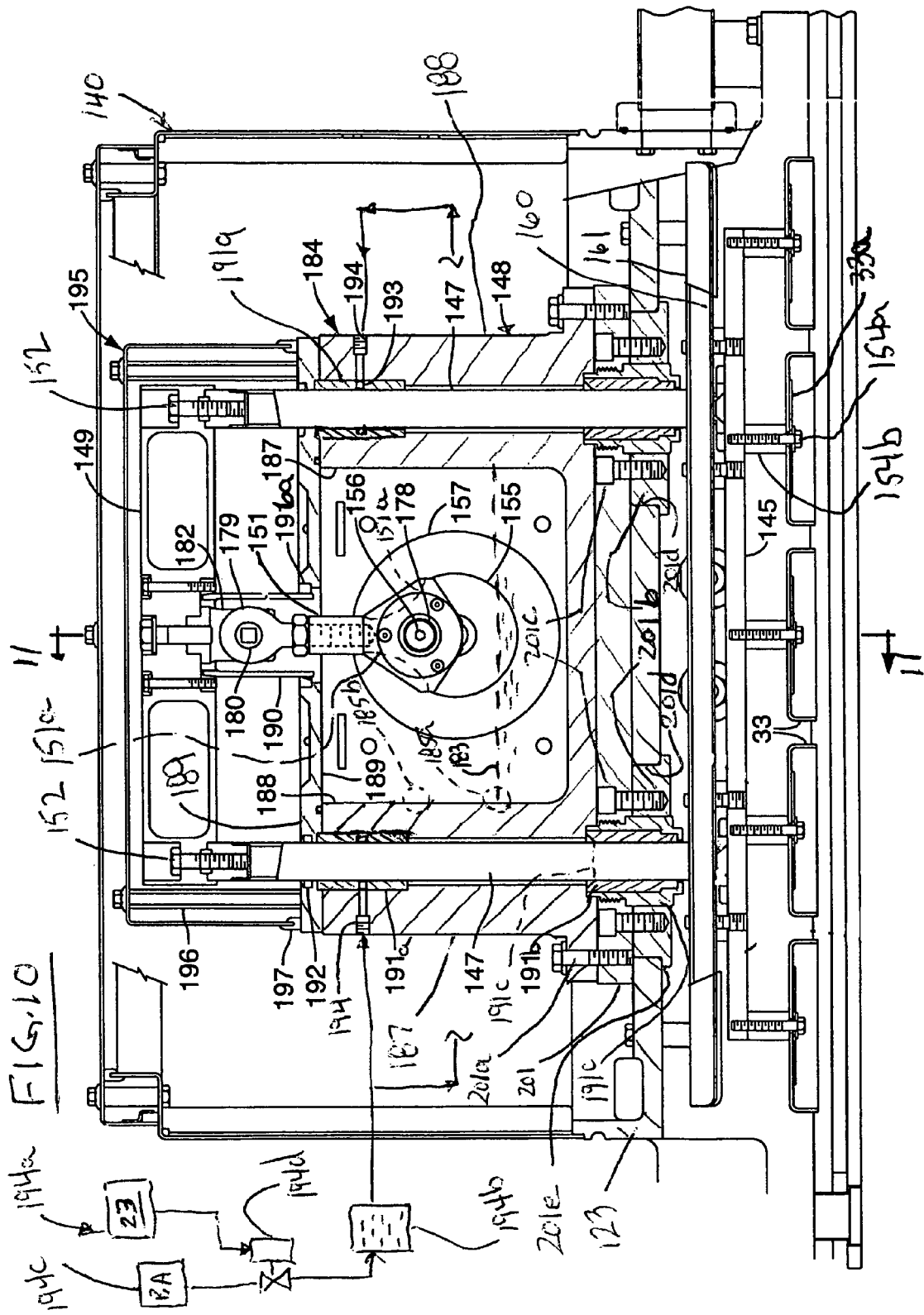

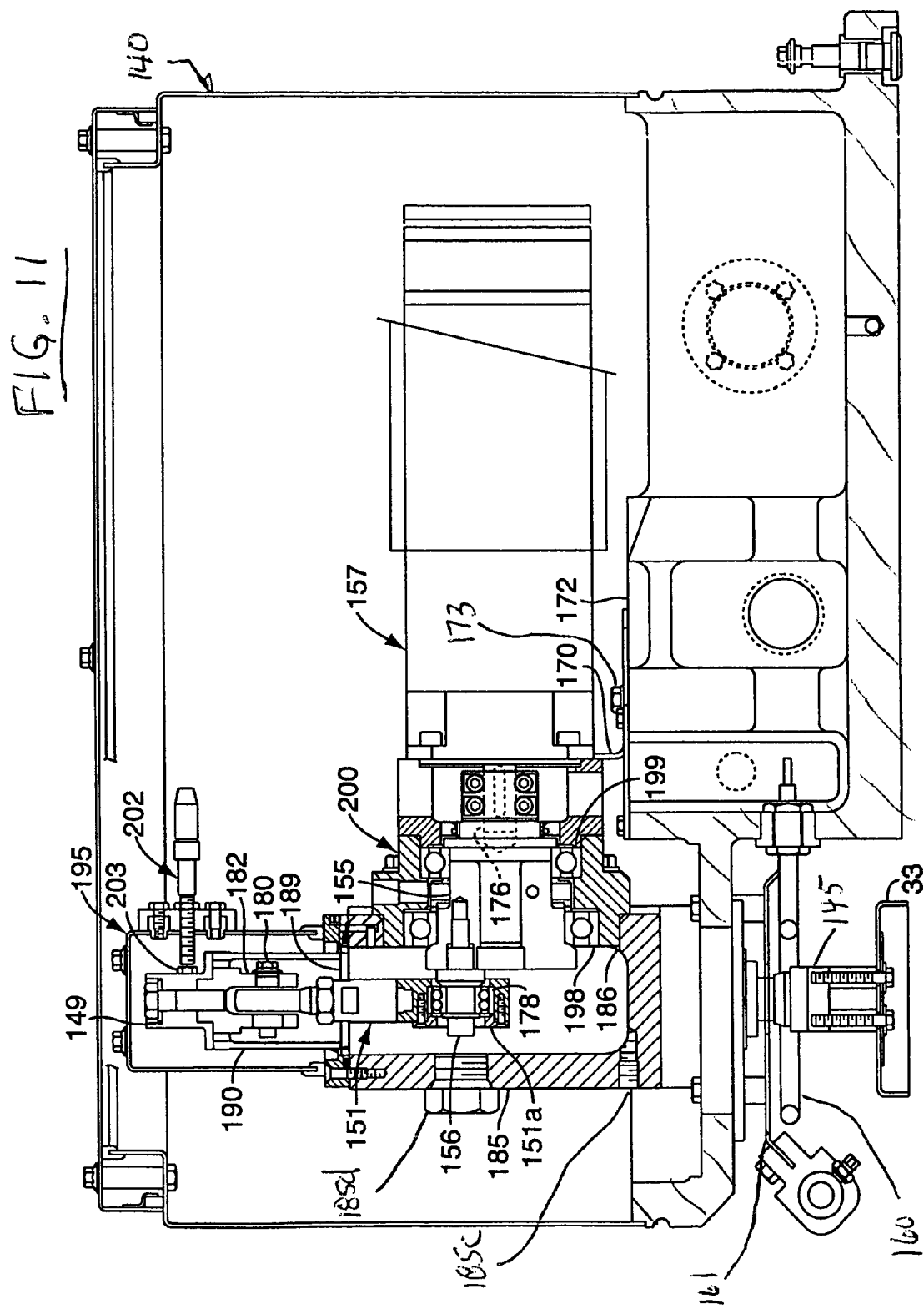

DRIVE SYSTEM FOR A KNOCKOUT APPARATUS FOR A PATTY-FORMING MACHINE

This application claims the benefit of U.S. provisional application Ser. No. 60/503,354, filed Sep. 16, 2003, and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Although heretofore known FORMAX patty-molding machines have achieved commercial success and wide industry acceptance, the present inventors have recognized that needs exist for a forming machine having increased energy efficiency, and a smoother and quieter patty-forming machine operation. The present inventors have recognized that needs exist for an enhanced controllability and ability to tune a patty-forming machine for particular food materials to be processed, for an enhanced effectiveness of a patty-forming machine in producing uniform patties. The present inventors have recognized the needs exist for an enhanced convenience for cleaning and maintenance of a patty-forming machine, and for an increased durability and an increased duration of maintenance free operation.

SUMMARY OF THE INVENTION

The present invention provides an improved knockout drive system for a food patty molding machine capable of producing uniform molded food patties at a high rate of production. The invention relates to reciprocating mold plate food patty molding machines wherein cavities in a reciprocating mold plate are filled when the mold plate is in or around a fill position, and the cavities are emptied by reciprocating knockout plungers when the mold plate is in a patty discharge position, to form patties.

The knockout drive system of the invention includes an electric motor; a rotary-to-linear motion converting apparatus operatively connected to the electric motor; and at least one knockout member operatively connected between the rotary-to-linear motion converting apparatus and the knockout plungers, to reciprocate the knockout plungers.

Preferably, the electric motor of the knockout drive system is a precise position controlled motor, such as a servo driven motor, wherein the speed, acceleration, deceleration and dwell periods of the knockout plungers can be precisely controlled to be synchronized with the mold plate movements and positions, and for the type of food product, the output rate and the shape of the patties.

According to one aspect of this system, the mold plate and knockout plungers are not mechanically linked to be driven together but are independently driven. Also, the reciprocating mold plate is preferably also driven by a separate, precise position controlled motor, such as a servomotor. More sophisticated mold plate and knockout plunger movements and sequencing can thus be programmed into, and synchronized by, the controller depending on the characteristics of the food product, the output rate, and the patty shape.

The invention also provides a knockout plunger arrangement that is easily adjusted in position to reduce overhang forces caused by the driving element being at a distance from the knockout plungers. According to the preferred embodiment of the invention, because the knockout plungers are driven by an independent motor drive, the motor can be shifted forwardly to reduce this overhang. This feature is particularly advantageous when multiple rows of knockout plungers are provided to discharge multiple rows of patties.

The invention provides an improved high-speed food patty molding machine that is subject to minimal wear in operation, and that requires minimal maintenance. The invention also provides an improved high-speed patty molding machine that is quiet in operation. The invention also provides an improved patty molding machine that has and enhanced energy efficiency. The invention also provides an improved high-speed food patty molding machine that is simple and cost effectively manufactured and assembled, and that can be readily disassembled for cleaning of the machine.

Numerous other advantages and features of the present invention will be become readily apparent from the following detailed description of the invention and the embodiments thereof, and from the accompanying drawings.

BRIEF DESCRIPTION OF THE DRAWINGS

FIG. 10 is a fragmentary sectional view taken generally along line 10-10 of FIG. 2, with some panels and/or components removed for clarity;

FIG. 11 is a fragmentary sectional view taken generally along line 11-11 of FIG. 10, with some panels and/or components removed for clarity;

DETAILED DESCRIPTION OF THE PREFERRED EMBODIMENTS

Figure 1:
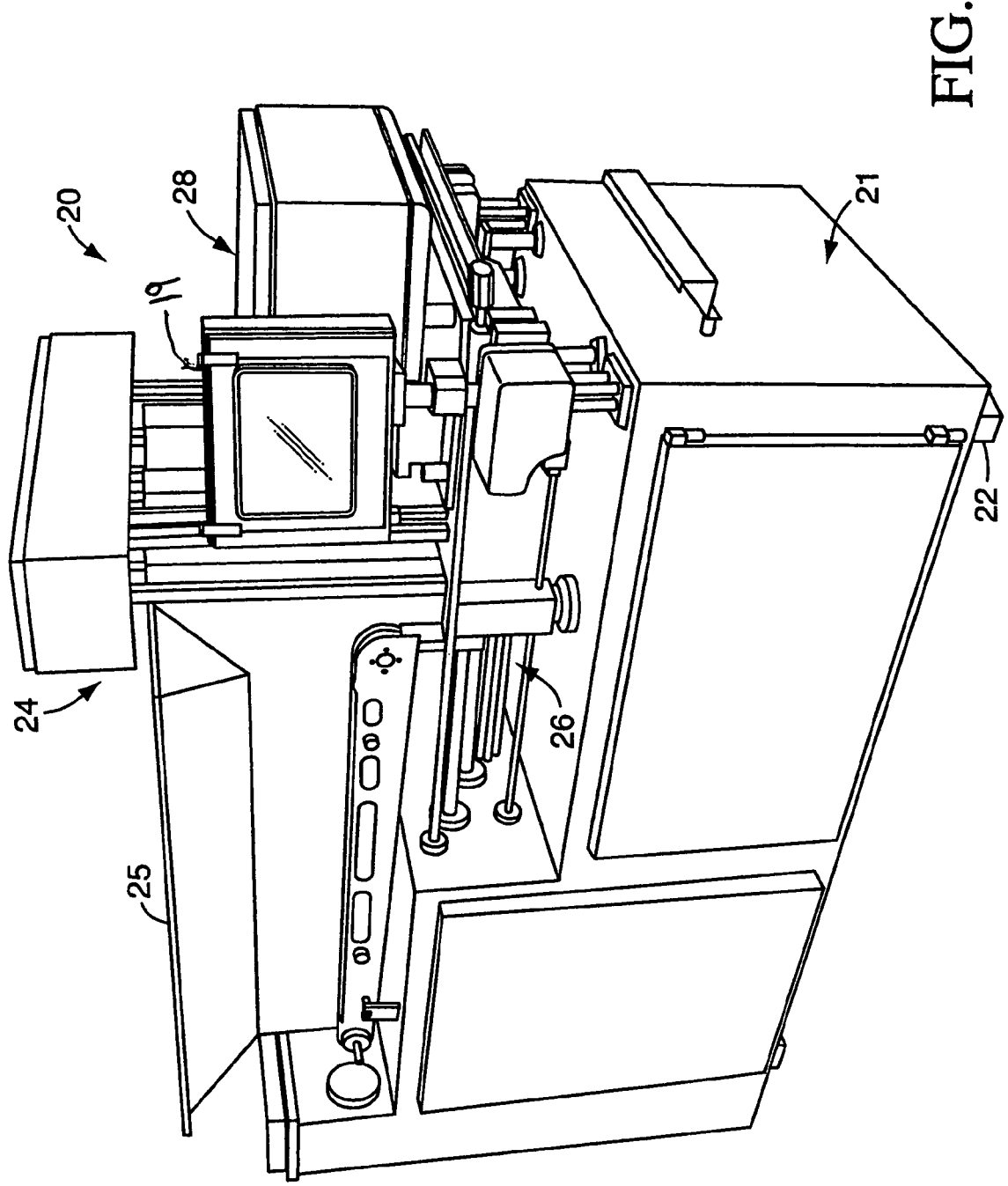
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises a preferred embodiment of the invention. The complete machine is described in U.S. Pat. No. 7255,554, and herein incorporated by reference. This application also incorporates by reference U.S. Application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contains hydraulic actuating systems, electrical actuating systems, and most of the machine controls. The machine 20 includes a supply 24 for supplying moldable food material, such as ground beef, fish, or the like, to the processing mechanisms of the machine.

Figure 12:
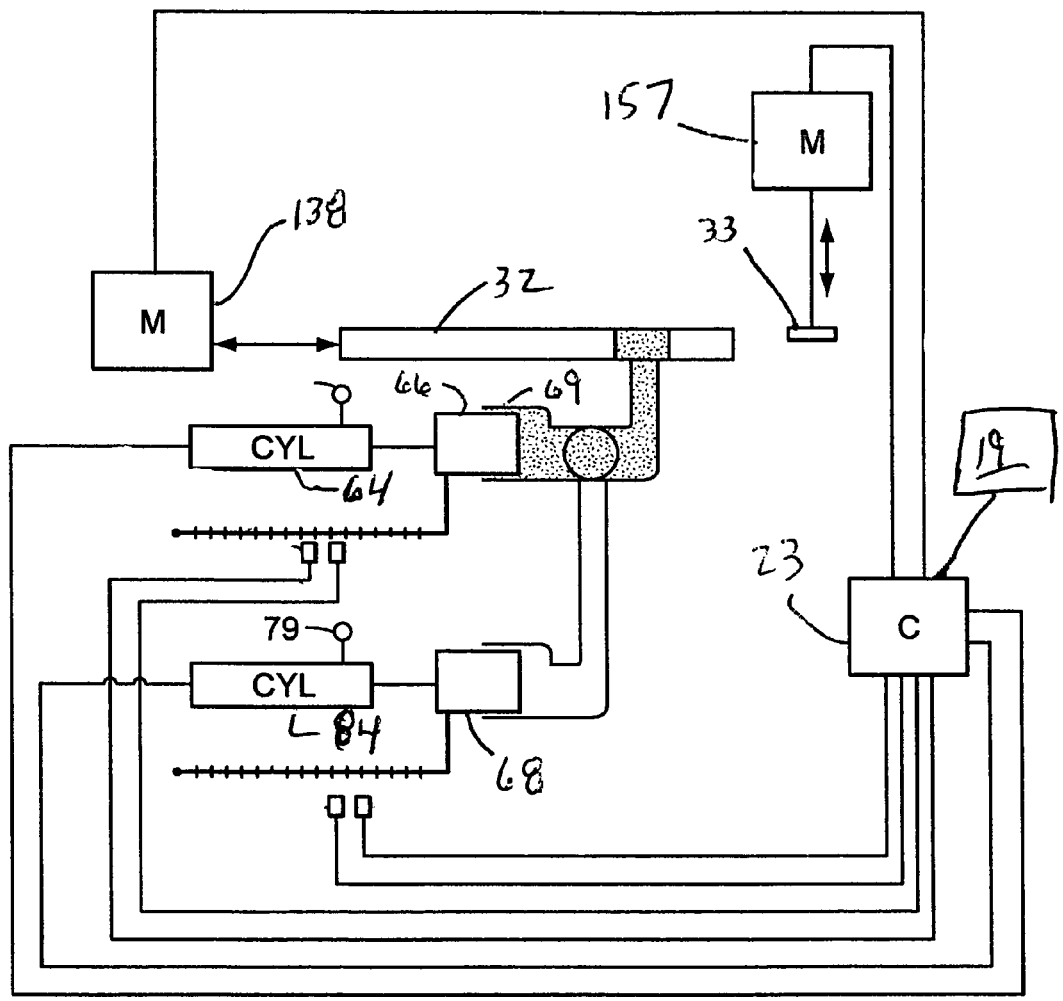
FIG. 12 is a schematic control diagram of the machine of the present invention.

A control panel 19, such as a touch screen control panel, is arranged on a forward end of the apparatus 20 and communicates with a machine controller 23, shown in FIG. 12.

As generally illustrated in FIGS. 2-6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 is substantially defined by a conveyor belt 31 of a conveyor 30. the conveyor belt has a top surface 31a for moving the food material longitudinally of the hopper 25 to a hopper forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1A:
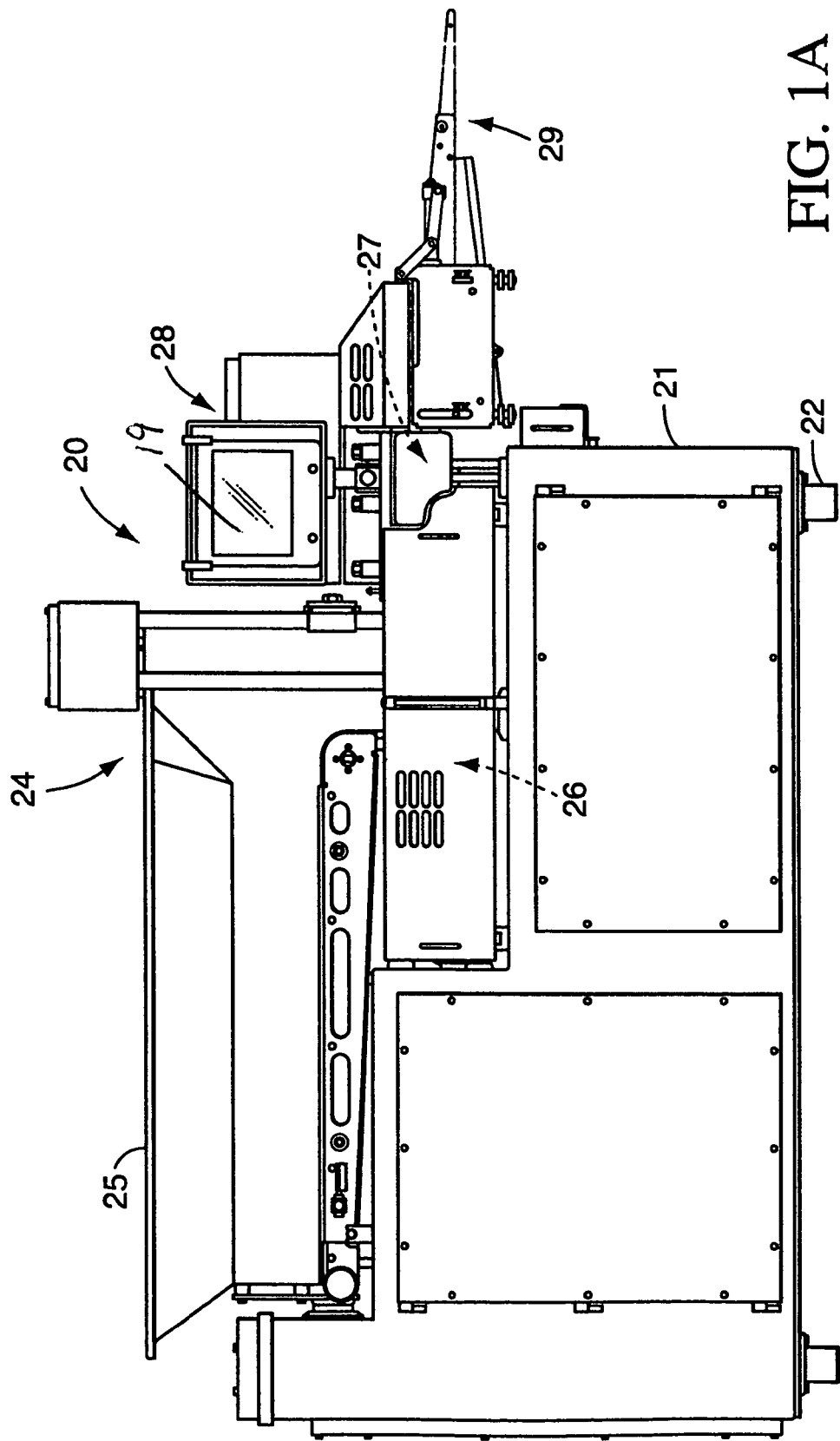
FIG. 1A is an elevational view of the patty-forming machine of FIG. 1.

The manifold 27 comprises a system for feeding the food material, still under relatively high pressure, into the molding mechanism 28. Molding mechanism 28 operates on a cyclic basis, first sliding a multi-cavity mold plate 32 into a receiving position over manifold 27 (FIG. 9A) and then away from the manifold to a discharge position (FIG. 9B) aligned with a series of knockout plungers such as knockout cups 33. When the mold plate 32 is at its discharge position, knockout cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2-6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted on top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
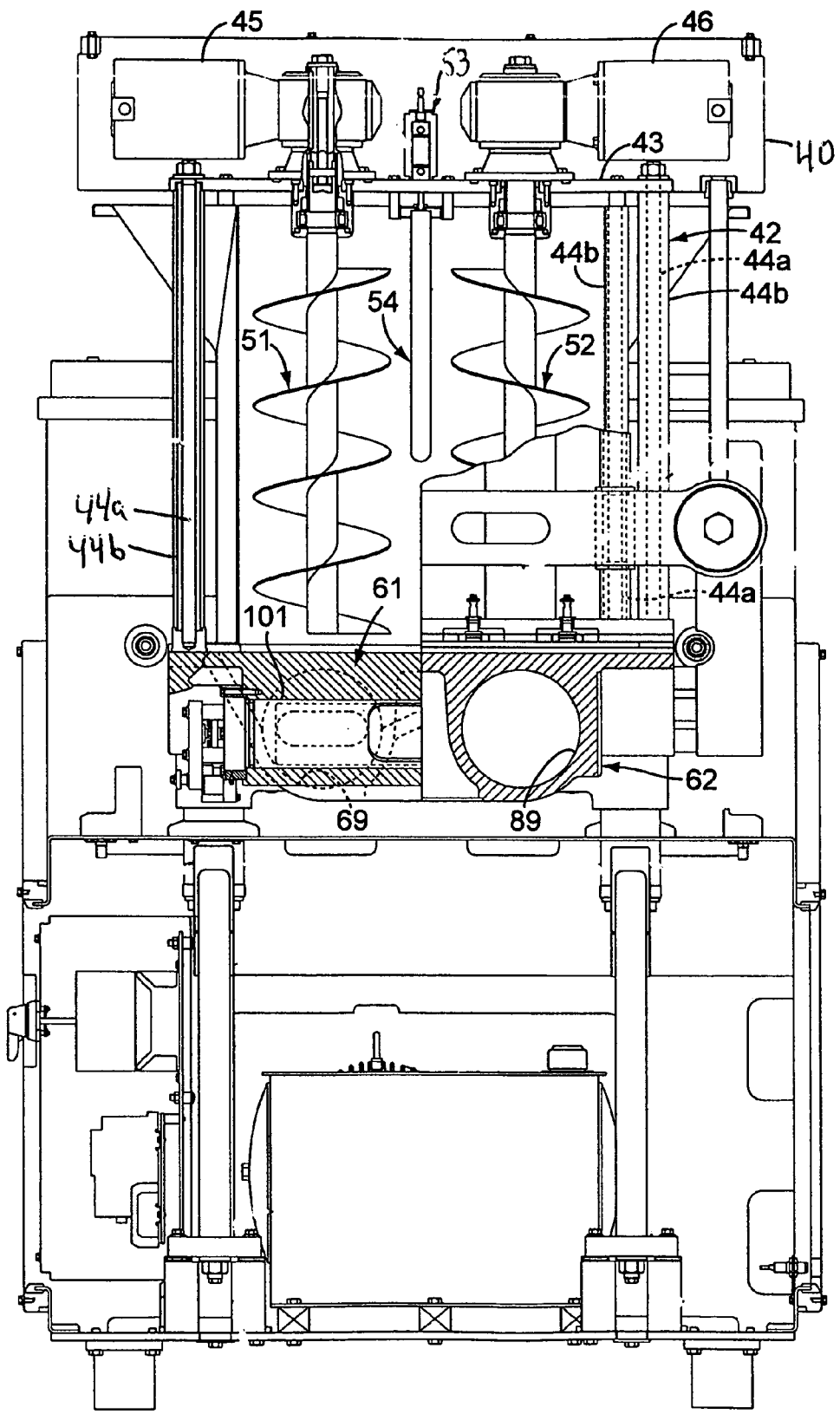
FIG. 5 is a sectional view taken generally along line 5-5 of FIG. 2, with some panels and/or components removed for clarity.

As shown in FIG. 5, the vertical pump 38 comprises two feed screw motors 45, 46 that drive feed screws 51, 52. The two electrical feed screw motors 45, 46 are mounted upon the support plate 43 within a motor housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25 comprising an elongated sensing element 54. As the moldable food material is moved forwardly in the hopper 25, it may accumulate to a level in which it engages the sensing element 54. When this occurs, a signal is generated to interrupt the drive for the roller 36 of conveyor 31. In this manner the accumulation of food material at the forward end 25a of hopper 25 is maintained at an advantageous level.

Figure 2:
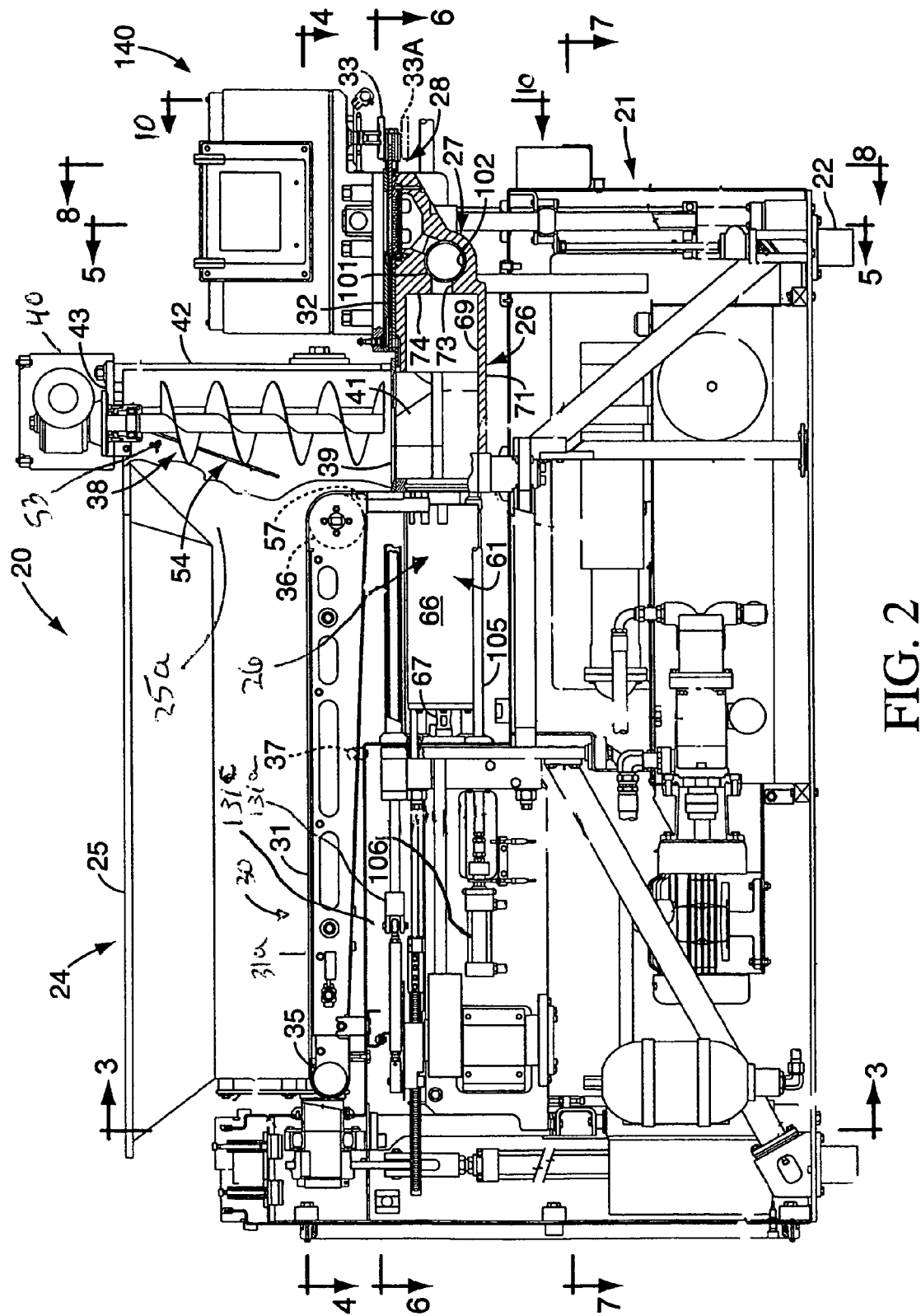
FIG. 2 is a longitudinal sectional view of the patty-forming machine of FIG. 1, with some panels and/or components removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 30 is stopped, as described above, until the supply at the hopper outlet is again depleted.

The wall of the outlet 39 immediately below conveyor drive rollers 36 comprises a belt wiper plate 57 that continuously engages the surface of the conveyor 31 to prevent leakage of the food material 38 from the hopper at this point.

Food Pump System

Figure 6:
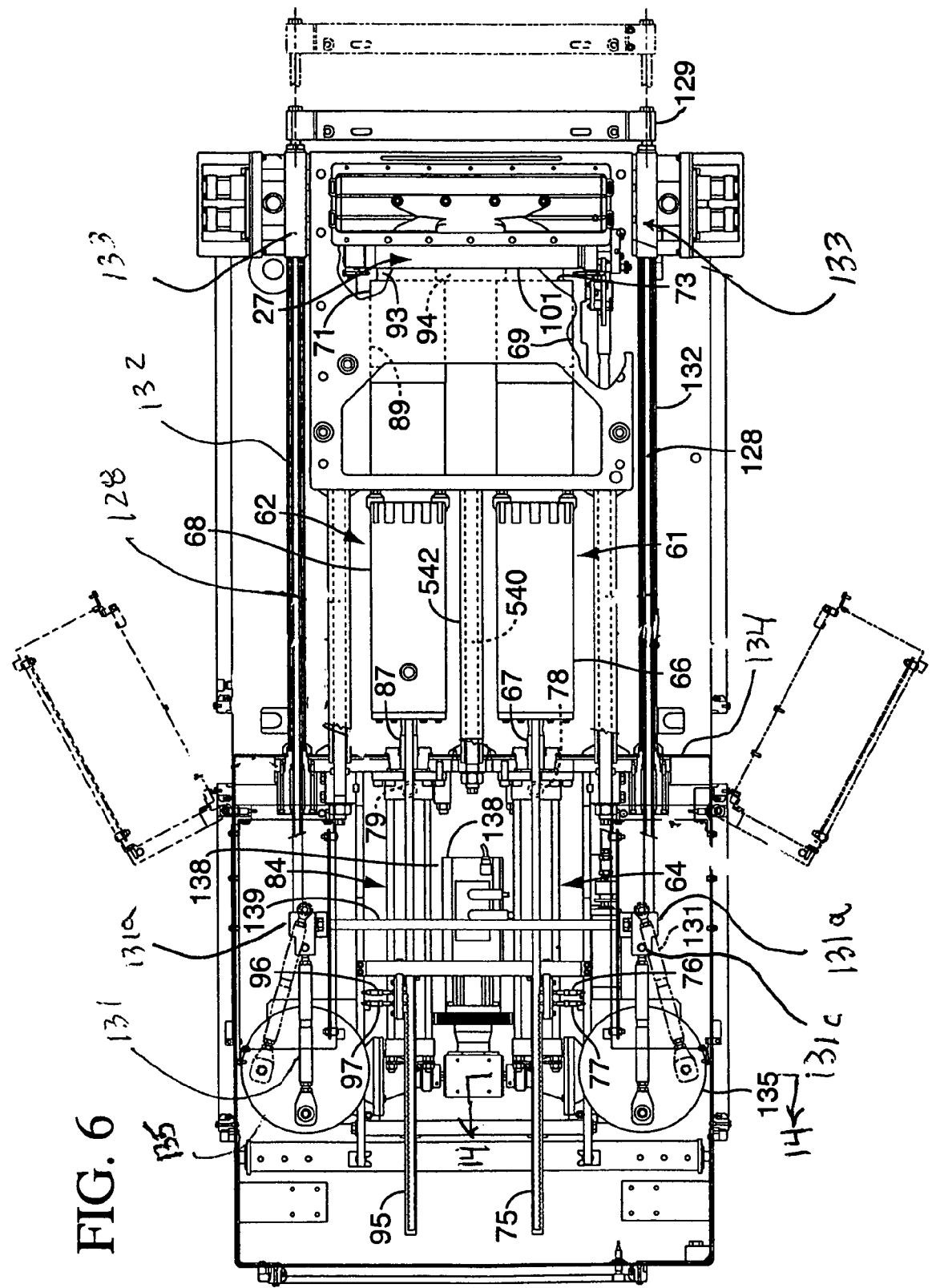
FIG. 6 is a sectional view taken generally along line 6-6 of FIG. 2, with some panels and/or components removed for clarity.
Figure 7:
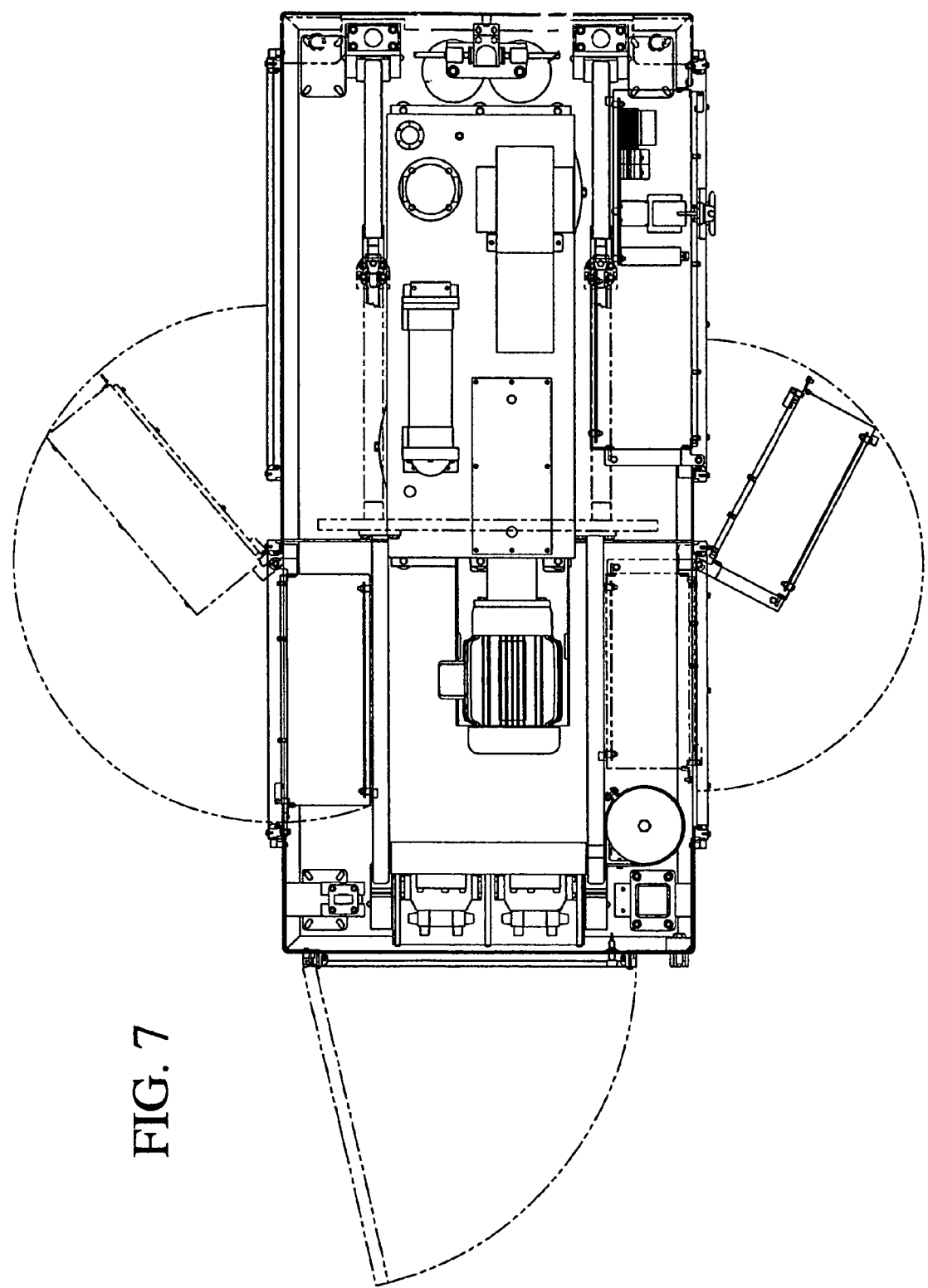
FIG. 7 is a sectional view taken generally along line 7-7 of FIG. 2, with some panels and/or components removed for clarity.
Figure 8:
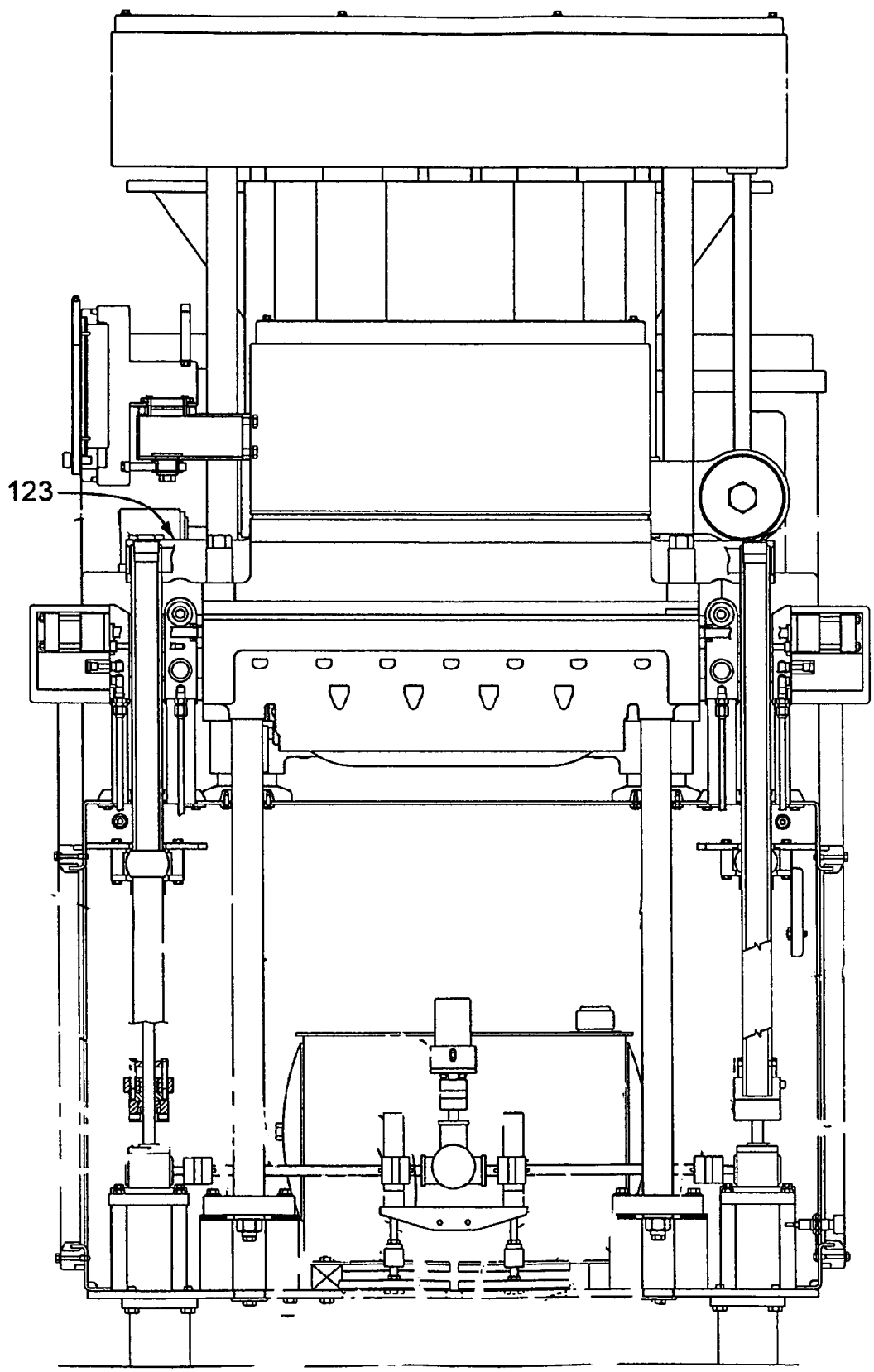
FIG. 8 is a sectional view taken generally along line 8-8 of FIG. 2, with some panels and/or components removed for clarity.

The food pump system 26 of molding machine 20 is best illustrated in FIGS. 2 and 6. Pump system 26 comprises the two reciprocating food pumps 61, 62 mounted on the machine base 21. The first food pump 61 includes a hydraulic cylinder 64. The piston (not shown) in cylinder 64 is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the pump manifold 27 as described more fully hereinafter.

Preferably, the pump housing 71 and the valve manifold 27 are cast or formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68 and pump cavities 69, 89 have round cross sections for ease of manufacturing and cleaning.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the chamber 69 during the molding cycle, or preferably can provide a pre-selected pressure profile over the molding cycle such as described in U.S. Pat. No. 4,356,595, incorporated herein by reference, or as utilized in currently available FORMAX machines.

When plunger 66 is near the end of its permitted range of travel, pump 62 is actuated to advance plunger 68 through pump cavity 89, compressing the food material in the second pump cavity in preparation for feeding the food material from the cavity into manifold 27.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, the changeover process described immediately above is reversed. Pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The valve manifold 27, shown in FIGS. 2 and 6, holds a manifold valve cylinder or tube valve 101 fit into an opening 102 in housing 71 immediately beyond the pump cavity walls 74 and 94.

According to the illustrated embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, which is in turn connected to the end of the piston rod 105 of a hydraulic actuator cylinder 106 (FIG. 2). Proximity sensors 106a, 106b communicate the rotary position of the valve cylinder to the machine controller 23.

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Pat. No. 7,125,245, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
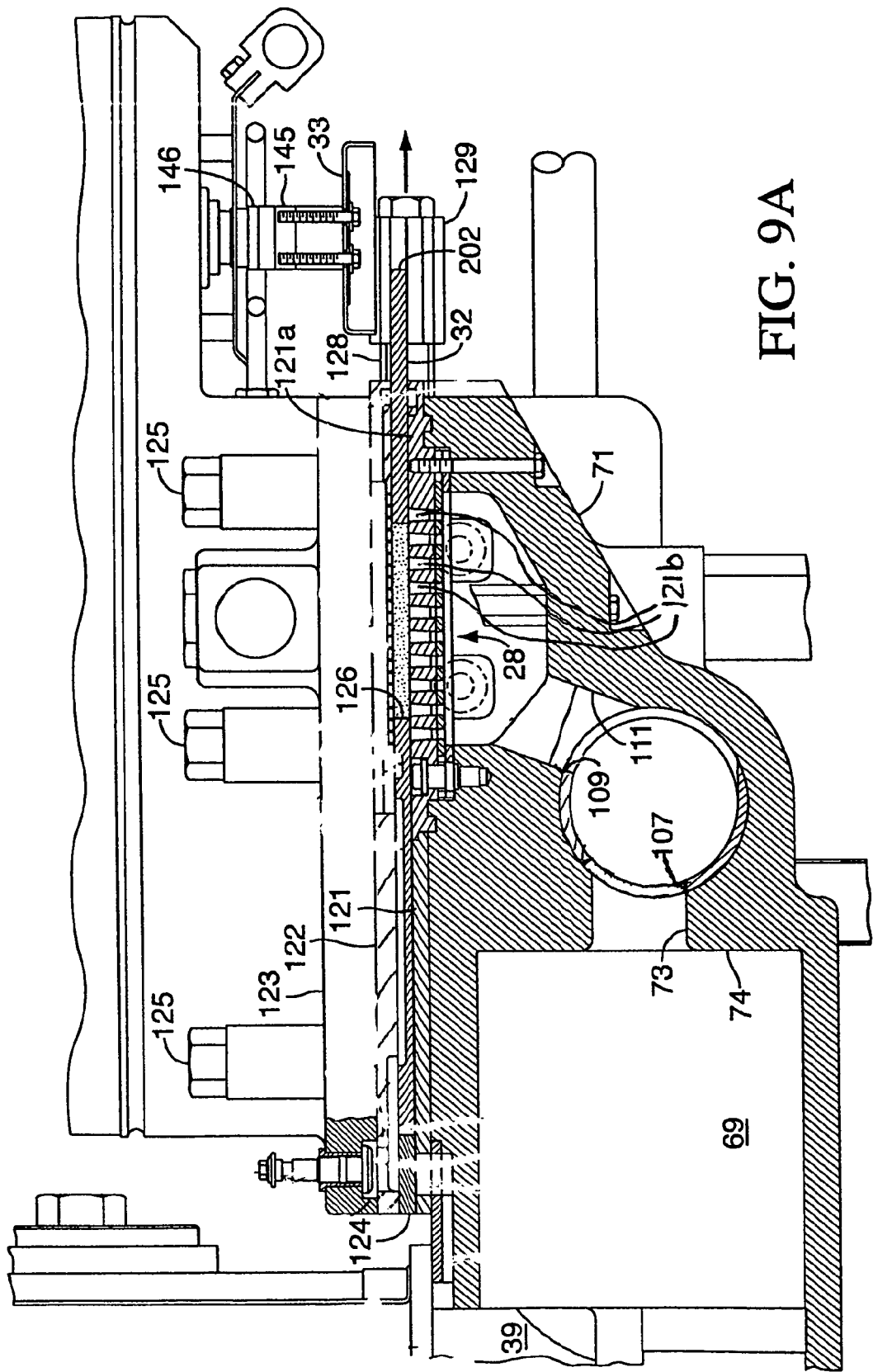
FIG. 9A is an enlarged fragmentary sectional view taken from FIG. 2, showing the machine configuration with the mold plate in a cavity fill position.

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown or a single plate bolted to or otherwise fixedly mounted upon housing 71. The fill plate 121a includes apertures or slots that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover casting 123 are held in place by six mounting bolts, or nuts tightened on studs, 125.

The cover plate 122 can be configured as a breather plate as part of a molding mechanism air-and-fines removal system, such as described in U.S. Ser. No. 10/942,755, filed on Sep. 16, 2004, which is herein incorporated by reference.

Figure 3:
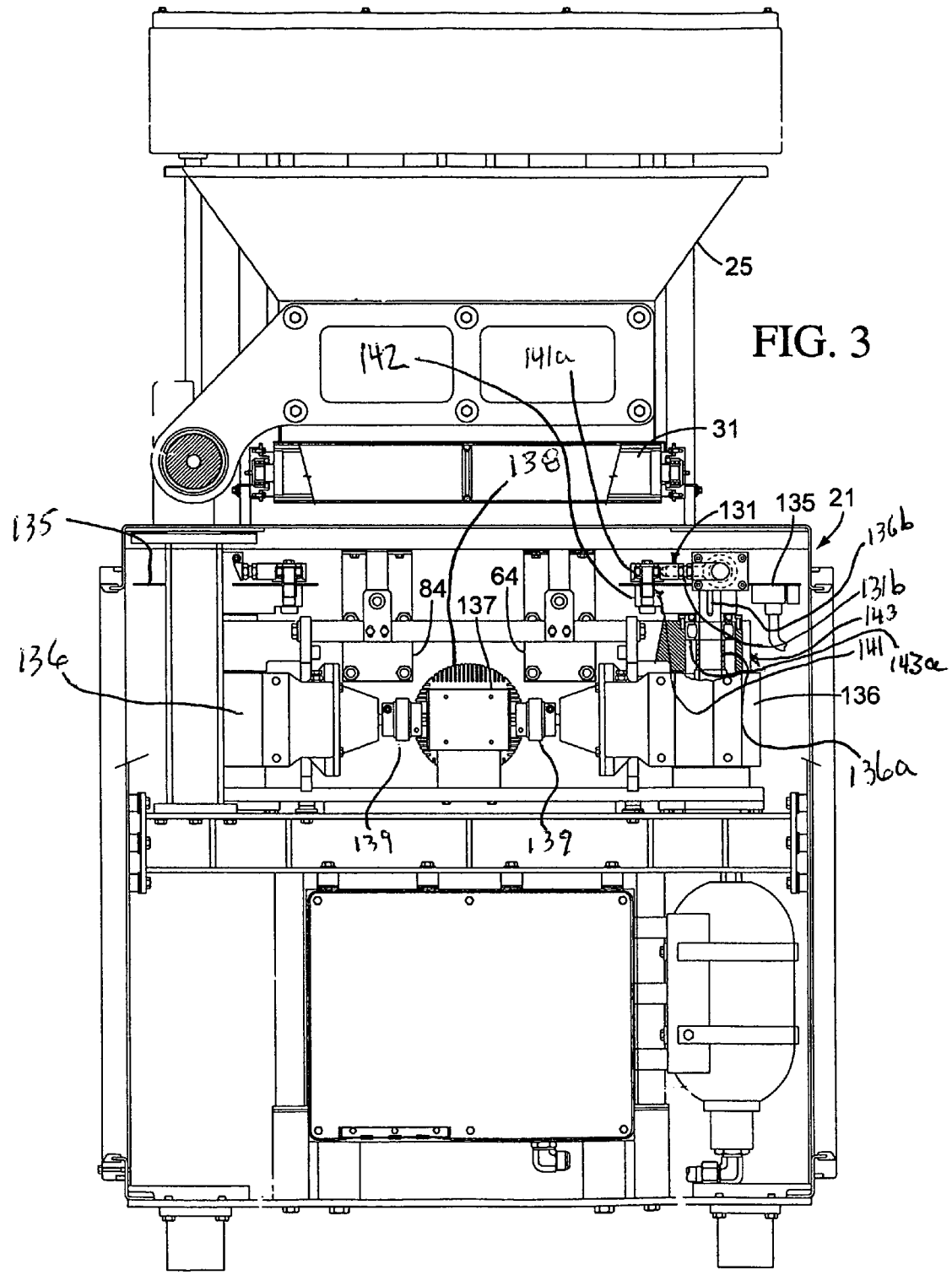
FIG. 3 is a sectional view taken generally along line 3-3 of FIG. 2, with some panels and/or components removed for clarity.
Figure 4:
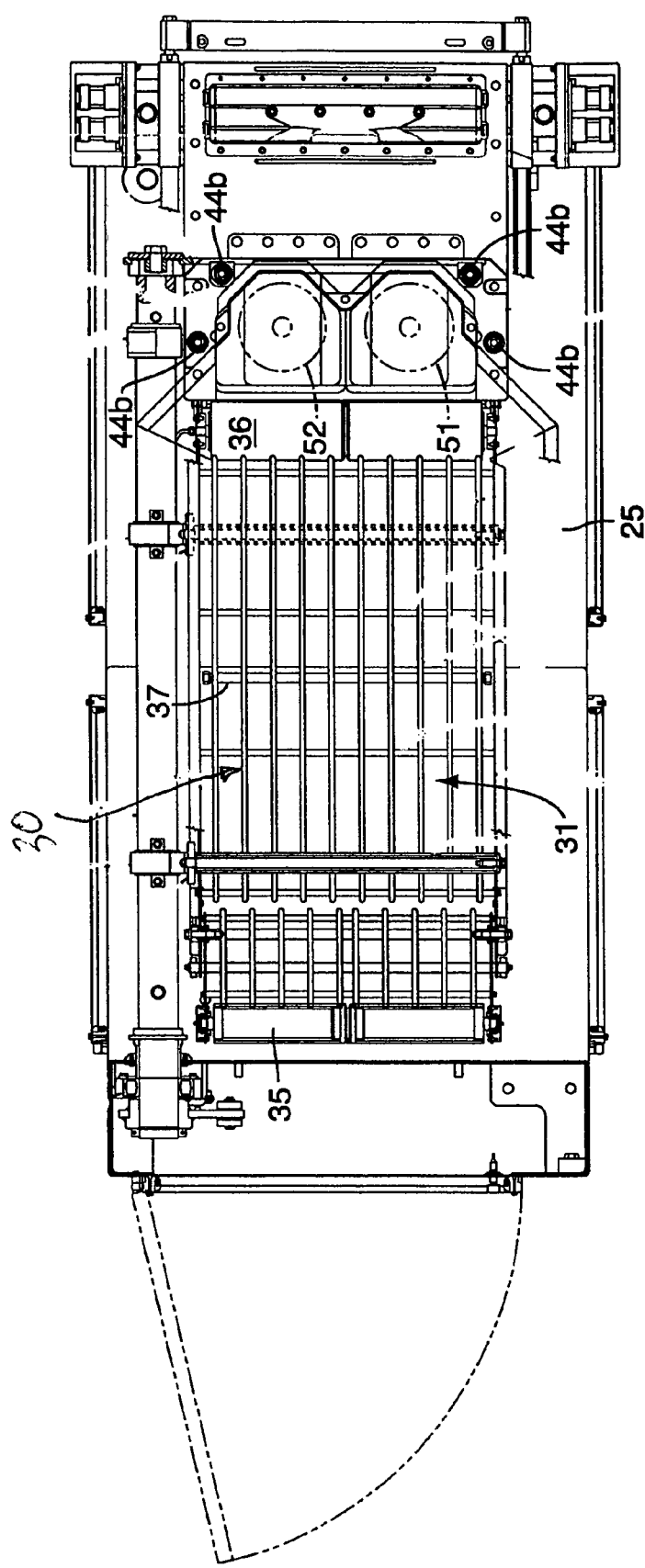
FIG. 4 is a sectional view taken generally along line 4-4 of FIG. 2, with some panels and/or components removed for clarity.

As best illustrated in FIGS. 3 and 6, mold plate 32 is connected to drive rods 128 that extend alongside housing 71 and are connected at one end to a transverse bar 129. The other end of each drive rod 128 is pivotally connected to a connecting link 131 via a coupling plate 131a and a pivot connection 131c, shown in FIG. 2. The pivot connection 131c can include a bearing (not visible in the figures) surrounding a pin within an apertured end of the connecting link 131. The pin includes a cap, or carries a threaded nut, on each opposite end to secure the crank arm to the coupling plate 131a.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141a that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131b to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6-7.5 HP totally enclosed fan cooled servo motor. The servo motor is provided with two modules: a power amplifier that drives the servo motor, and a servo controller that communicates precise position information to the machine controller 23.

The controller 23 and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143a therein to journal an output shaft 136a of the gear box 136. The output shaft 136a is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136b on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

Figure 14:
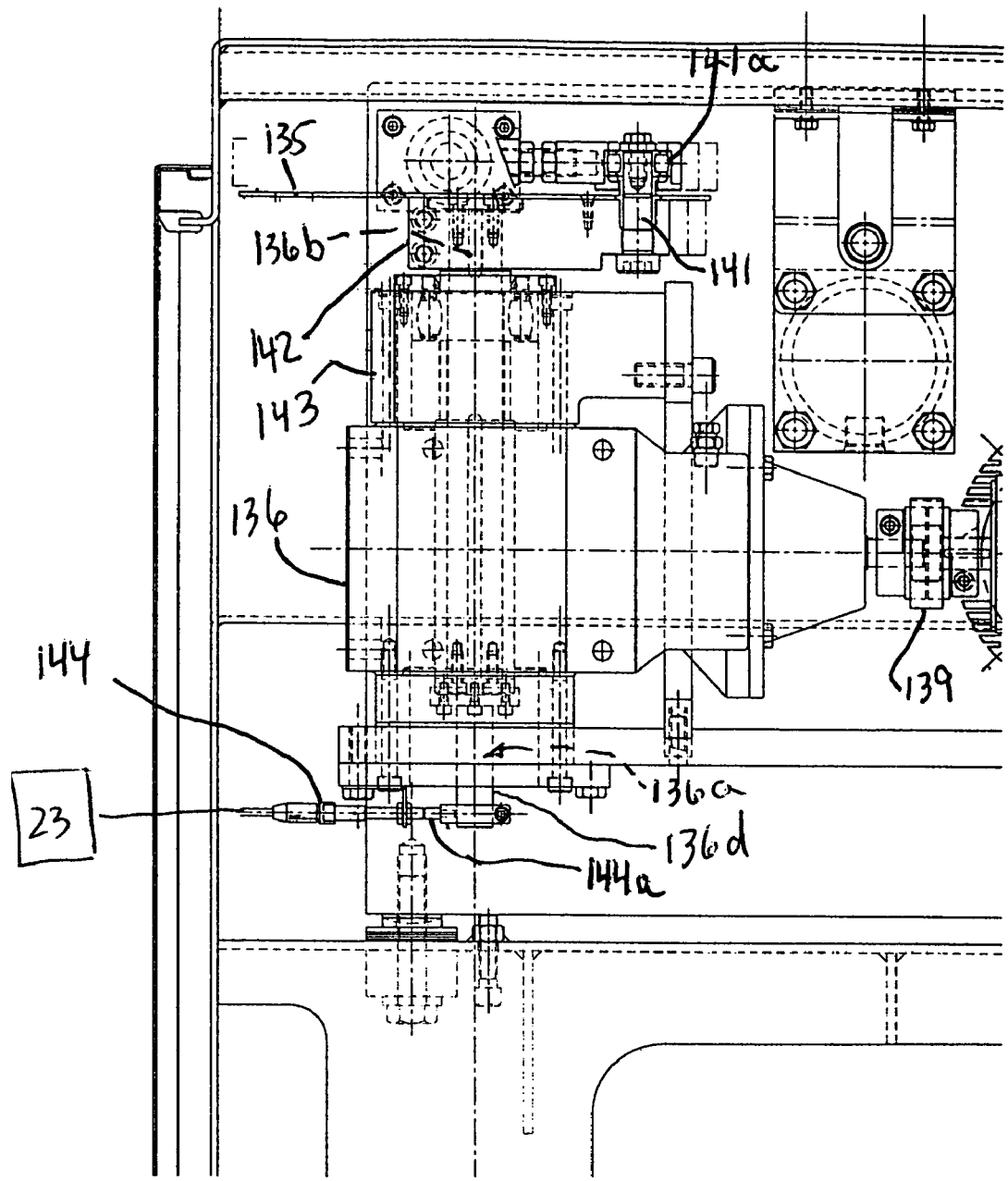
FIG. 14 is enlarged, fragmentary sectional view taken generally along line 14-14 of FIG. 6, with some components and/or panels removed for clarity.

FIG. 14 illustrates a proximity sensor 144 in communication with the machine control. A target 144a is clamped onto an extension 136d of the rotating shaft 136a. The proximity sensor 144 communicates to the controller 23 that the crank arm 142 is at a particular rotary position corresponding to the mold plate 32 being at a pre-selected position. Preferably, the proximity sensor 144 can be arranged to signal to the controller that the crank arm 142 is in the most forward position, corresponding to the mold plate 32 being in the knockout position. The signal confirms to the controller that the knockout cups 33 can be safely lowered to discharge patties, without interfering with the mold plate 32.

During a molding operation, the molding mechanism 28 is assembled as shown in FIGS. 2 and 9A, with cover plate 122 tightly clamped onto spacers 124.

Figure 9B:
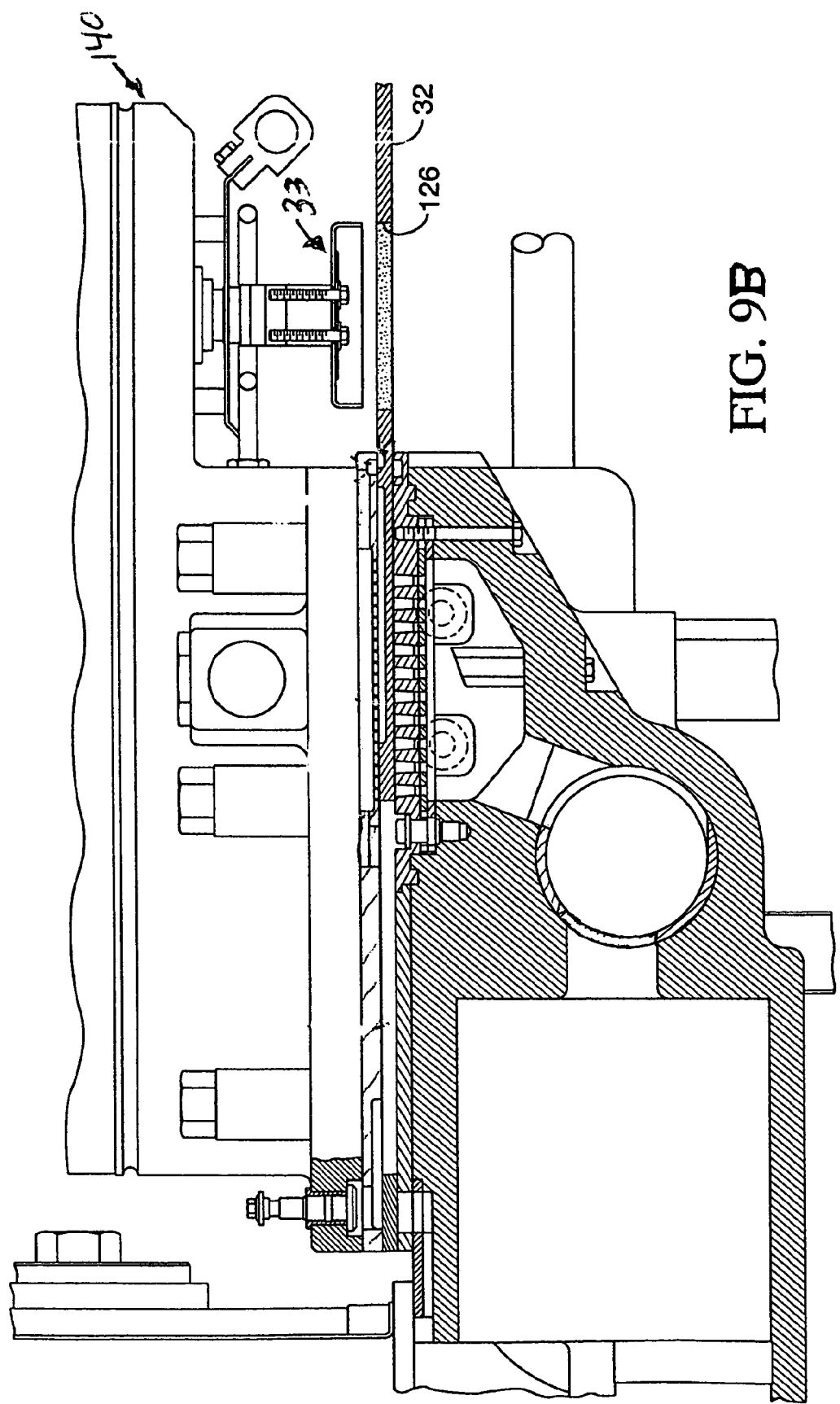
FIG. 9B is an enlarged fragmentary sectional view taken from FIG. 2, showing the machine configuration with the mold plate in a patty discharge position.

In each cycle of operation, knockout cups 33 are first withdrawn to the elevated position as shown in FIG. 9B. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIGS. 9A, 9B, 10 and 11, with knockout cups 33 clear of mold plate 32. When mold plate 32 reaches its extended discharge position as shown in FIG. 9B, the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

By using a servo motor to drive the mold plate, the mold plate motion can be precisely controlled. The motion can have a fully programmable dwell, fill time, and advance and retract speeds.

Knockout System

Molding mechanism 28 further comprises a knockout apparatus 140 shown in FIGS. 2, 9A, 10-11, 13A and 13B. The knockout apparatus comprises the knockout plungers or cups 33, which are fixed to a carrier bar 145. Knockout cups 33 are coordinated in number and size to the mold cavities 126 in the mold plate 32. One knockout cup 33 is aligned with each mold cavity 126. The mold cavity size is somewhat greater than the size of an individual knockout cup.

The knockout apparatus 140 is configured to drive the carrier bar 145 in timed vertical reciprocation.

FIGS. 10-11, 13A and 13B illustrate the knockout apparatus 140 in more detail. The carrier bar 145 is fastened to knockout support brackets 146a, 146b. The knockout support brackets 146a, 146b are carried by two knockout rods 147. Each knockout rod 147 is disposed within a wall of a knockout housing 148 and is connected to a knockout beam 149.

The knockout beam 149 is pivotally mounted to a crank rod 151 that is pivotally connected to a fastener pin 156 that is eccentrically connected to a crank hub 155 that is driven by a motor 157.

The motor is preferably a precise position controlled motor, such as a servo motor. An exemplary servomotor for this application is a 3000 RPM, 2.6 kW servo motor provided with a brake. The servo motor is provided with two modules: a power amplifier that drives the servo motor, and a servo controller that communicates precise position information to the machine controller 23.

The controller 23 and the motor 157 are preferably configured such that the motor rotates in an opposite direction every cycle, i.e., clockwise during one cycle, counterclockwise the next cycle, clockwise the next cycle, etc.

A heating element 160 surrounds, and is slightly elevated from the knockout carrier bar 145. A reflector 161 is mounted above the heating element 160. The heating element heats the knock out cups to a pre-selected temperature, which assists in preventing food product from sticking to the knock out cups.

In FIGS. 10 and 11, the crank hub 155 is rotated into a position wherein the crank rod 151 is vertically oriented and the knockout beam 149 is lifted to its maximum elevation. The knockout rods are fastened to the knockout beam 149 by fasteners 152. The knockout support brackets 146a, 146b are in turn fastened to the knockout rods 147 by fasteners 153. Each knockout cup 33 is fastened to the knockout carrier bar by a pair of fasteners 154a and spacers 154b. An air flap or air check valve 33a can be provided within each cup to assist in dispensing of a meat patty from the cup 33.

As shown in FIG. 11, the motor 157 is supported by a bracket 170 from a frame member 172 that is mounted to the casting 123. The bracket 170 includes one or more slotted holes, elongated in the longitudinal direction (not shown). One or more fasteners 173 penetrate each slotted hole and adjustably fix the motor 157 to the frame member. The motor 157 includes an output shaft 176 that is keyed to a base end of the crank hub 155. The fastener pin 156 retains a roller bearing 178 thereon to provide a low friction rotary connection between an annular base end 151a of the crank rod 151 and the pin 156.

The crank rod 151 has an apertured end portion 179 on an upper distal end 151b opposite the base end 151a. The apertured end portion 179 is held by a fastener pin assembly 180 through its aperture to a yoke 182. The yoke 182 is fastened to the knockout beam 149 using fasteners. The fastener pin assembly 180 can include a roller or sleeve bearing (not shown) in like fashion as that used with the fastener pin 156 to provide a reduced friction pivot connection.

The housing 148 is a substantially sealed housing that provides an oil bath. Preferably, the housing walls and floor is formed as a cast aluminum part. The crank hub 155, the pin 156, roller bearing 178, the apertured end portion 179, the fastener pin 180 and the yoke 182 are all contained within the oil bath having an oil level 183. The limits of the oil bath are defined by a housing 184 having a front wall 185, a rear wall 186, side walls 187, 188, a top wall 189 and a sleeve 190. The sleeve 190 is a square tube that surrounds a substantial portion of the crank rod 151 and is sealed around its perimeter to the top wall 189 by a seal element 196a. The sleeve 190 is connected to the beam 149 and penetrates below the top wall 189. As the yoke 182 reciprocates vertically, the beam 149 and the sleeve 190 reciprocate vertically, the sleeve 190 maintaining a sealed integrity of the oil bath.

The crank rod 151 includes side dished areas 151a that act to scoop and propel oil upward during rotation of the hub 155 to lubricate the pin 180 and surrounding areas.

The knockout rods 147 are guided to reciprocate through the side walls 187, 188, particularly, through upper and lower bearings 191a, 191b. The rods 147 are sealed to the top wall by seals 192. The bearings 191a can include an internal groove 193 that is in flow-communication with a lubricant supply through port 194.

A lubricant system 194a is provided to provide lubricant to the bearings 191a, 191b. The system 194a includes a lubricant reservoir 194b that is filled with lubricant, such as oil, and connected to plant air 194c via an electronically controlled valve 194d. The machine controller 23 periodically, according to a preset routine, actuates the valve 194d to propel some lubricant into the bearings 191a. Lubricant can run down the knockout rod 147 into a dished top 191c of the lower bearings 191b to allow oil to penetrate between the knockout rods 147 and the lower bearings 191b.

An outer cover 195 is fastened and sealed around the side walls 187, 188 and front and rear walls 185, 186 by fasteners, spacers 196 and a seal 197. Any lubricating oil that passes through the seal can be returned to the oil bath via dished out drain areas and drain ports through the top wall.

The front wall 185 includes an oil level sight glass 185a, a fill port 185b (shown dashed in FIG. 10), a drain port 185c (FIG. 11); and an access hole closed by a screw 185d (FIG. 11).

The crank hub 155 is journaled for rotation by two roller bearings 198, 199. The roller bearings 198, 199 are supported by a collar assembly 200 bolted to the rear wall 186 and to the motor 157.

The knockout assembly is changeable to extend further forwardly to minimize knockout cup cantilever. This is accomplished by loosening the bracket 170 from the frame member 172 and sliding the motor and all the connected parts forward or rearward and replacing circular adapter plates for the knockout rods 147.

The housing 148 is fastened to a support plate 201 by fasteners 201a. The support plate 201 is fastened to circular adapter plates 201b by fasteners 201c. The circular adapter plates 201b are removably fit into circular holes 201d in the casting 123. The circular adapter plates 201b include a bottom flange 201e which abuts the casting 123. The circular adapter plates 201b surround the bearings 191b and associated bearing assemblies 191c.

Figure 10A:
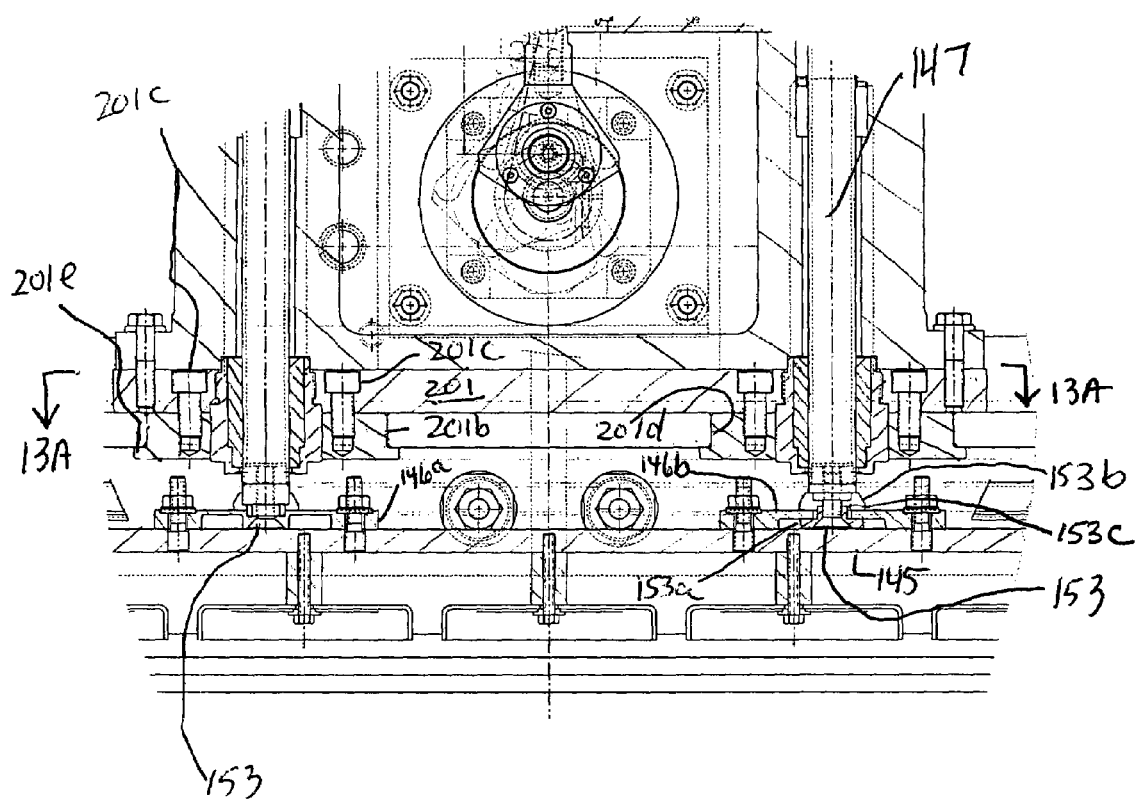
FIG. 10A is a fragmentary sectional view taken from FIG. 10, with some components removed for clarity.

As shown in FIG. 10A, the left bracket 146a is fixedly connected to the left knockout rod 147 using the fastener 153 while the right bracket 146b is connected for a sliding connection. In this regard the right fastener 153 passes through an inverted T-nut 153a that passes through the bracket 146b and fits into a back up washer 153b that abuts the top side of the bracket 146b. The bracket 146b includes an oversized opening in the lateral direction that allows the bracket 146b to shift laterally with respect to the T-nut and knockout rod 147. This arrangement allows the bar 145 to expand and contract laterally with respect to the knockout rods 147. When the knockout cups 33 are heated by the heating element 160, the carrier bar 145 can become heated as well. Preferably, the carrier bar 145 is composed of aluminum which can expand to a significant degree. The sliding connection of the bracket 146b accommodates this thermal expansion.

The knockout assembly is changeable to extend further forwardly to minimize knockout cup cantilever and stress in supporting members. This is accomplished by loosening the bracket 170 from the frame member 172 and sliding the motor 157 and the connected parts forward or rearward and replacing the circular adapter plates that guide the knockout rods 147.

Figure 13A:
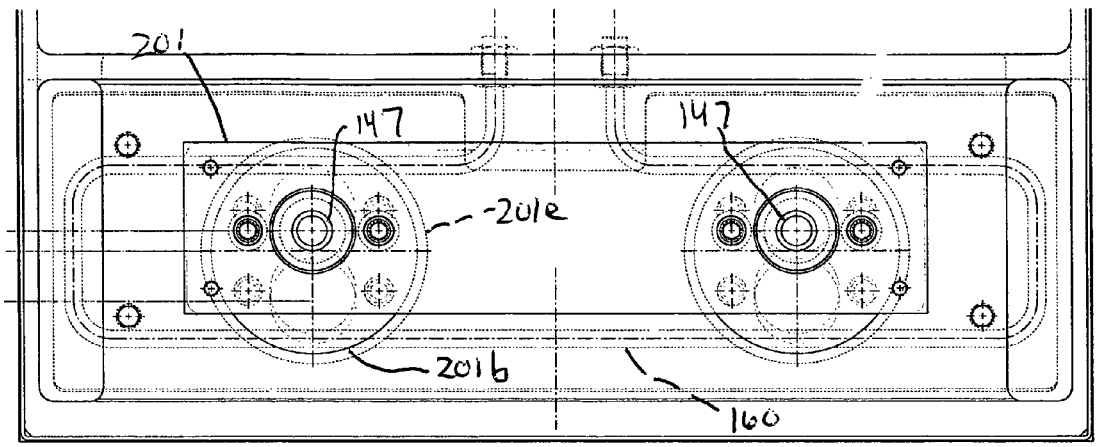
FIG. 13a is a fragmentary sectional view taken generally along line 13A-13A of FIG. 10A showing the knock out apparatus in a rear position, with some panels and/or components removed for clarity.
Figure 13B:
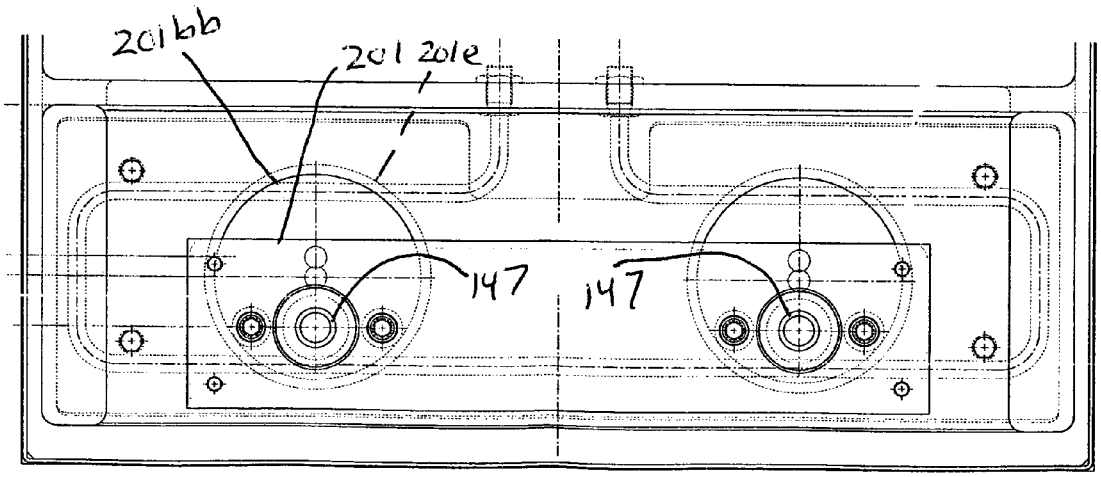
FIG. 13B is a sectional view similar to FIG. 13A showing the knockout apparatus in a forward position.

As demonstrated in FIGS. 13A and 13B, to change the longitudinal position of the knockout cups 33, the support plate 201 is shifted longitudinally. Replacement circular adapter plates 201bb are fit into the casting 123 from below. The replacement circular adapter plates 201bb include different hole patterns for the knockout rods 147, forwardly or rearwardly shifted, to accommodate the new position of the support plate 201.

A proximity sensor 202 is bolted to the outer cover 195, and a target 203 is provided on the crank beam 149 to be sensed by the proximity sensor 202. The proximity sensor 202 communicates to the controller 23 that the knockout cups are raised and the mold plate can be retracted without interfering with the knockout cups.

The movement of the knockout cups is fully programmable for different motion profiles, including dwell, accelerations and extend and retract speeds. Such motion profiles may be useful depending on the properties of the food product to be discharged from the mold plate cavities. Because both the mold plate and the knockout cups can be driven by programmable, controlled servo motors, they can be flexibly sequenced without being restricted in motion by a common mechanical system.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a reciprocating mold plate patty-forming machine, a knockout drive for reciprocating a knockout plunger to discharge molded food patties from a cavity in the mold plate, the mold plate being reciprocated by a mold plate drive between a cavity fill position and a cavity discharge position, the knockout drive comprising:
   at least one knockout plunger;
   an electric motor mechanically independent of the mold plate drive, said electric motor adjustable in speed independent of speed of the mold plate, said electric motor having a rotary output shaft controllable in rotary movement independent of the movement of the mold plate drive;
   a rotary-to-linear motion apparatus comprising a crank rod eccentrically connected to a rotary member; said rotary member operatively connected to said rotary output shaft of said electric motor; and
   at least one knockout member operatively connected to said rotary-to-linear motion apparatus, said knockout member connected to the knockout plunger to reciprocate said knockout plunger.

2. The knock-out drive according to claim 1, wherein said electric motor comprises a precise position controlled motor.

3. The knock-out drive according to claim 1, wherein said at least one knockout plunger comprises a plurality of knockout plungers, and comprising a knockout frame carrying said knockout plungers, and
   wherein said rotary member comprises an axis of rotation concentric with an axis of rotation of said rotary output shaft, and
   wherein said crank rod extends perpendicular to said axis of rotation of said rotary member,
   and said crank rod is operatively, pivotally connected eccentrically to said axis of rotation of said rotary member, said crank rod pivotally connected at an opposite end to said knockout frame.

4. The knock-out drive according to claim 3, comprising a housing configured for containing an oil bath, said crank rod located within said housing.

5. The knock-out drive according to claim 4, wherein said housing comprises a top wall and a sleeve that sealingly penetrates through said top wall, said sleeve fixed to a top end of said crank rod to reciprocate with said crank rod.

6. The knock-out drive according to claim 4, wherein said rotary member comprises a crank hub; said crank hub fixed to said output shaft to rotate therewith, said crank rod pivotally connected to said crank hub.

7. The knock-out drive according to claim 6, comprising a roller bearing carried by said housing, wherein said crank hub is journaled for rotation by said roller bearing.

8. The knock-out drive according to claim 1, wherein said at least one knockout member comprises a beam and two knockout rods fixed to said beam, and a knockout support fixed to said knockout rods, said knockout support carrying said knockout plungers.

9. In a reciprocating mold plate patty-forming machine, a knockout drive for reciprocating a knockout plunger to discharge molded food patties from a cavity in the mold plate, the mold plate being reciprocated by a mold plate drive between a cavity fill position and a cavity discharge position, the knockout drive comprising:
   at least one knockout plunger;
   an electric motor mechanically independent of the mold plate drive, said electric motor adjustable in speed independent of speed of the mold plate, said electric motor having a rotary output shaft controllable in rotary movement independent of the movement of the mold plate drive;
   a rotary-to-linear motion apparatus operatively connected to said rotary output shaft of said electric motor;
   at least one knockout member operatively connected to said rotary-to-linear motion apparatus, said knockout member connected to the knockout plunger to reciprocate said knockout plunger, said knockout member having at least one knockout rod operatively connected to at least one said knockout plunger; and,
   a housing configured as an oil reservoir, said rotary-to-linear motion apparatus located within said oil reservoir, wherein said at least one knockout rod is guided for linear movement by penetrating through walls of said housing.

10. In a patty forming apparatus that comprises a reciprocating mold plate that includes a fill position in which cavities of the mold plate are filled with food product and a discharge position wherein knockout plungers mechanically drive the patties from the cavities, the improvement comprising:
    a precise position controlled motor having a rotary output shaft controllable in rotary movement independent of the movement of the mold plate;
    a rotary-to-linear motion conversion device receiving rotary motion from said rotary output shaft; said rotary-to-linear motion device comprises a crank rod eccentrically connected to a rotary member; said rotary member operatively connected to said rotary output shaft of said electric motor;
    a plurality of knockout plungers operatively connected to said rotary-to-linear motion conversion device to be driven into linear motion to pass into said cavities to discharge patties, and subsequently to withdraw from said cavities.

11. The improvement according to claim 10, wherein said precise position controlled motor comprises a servomotor.

12. The improvement according to claim 10, comprising a frame carrying said knockout plungers, and
    wherein said rotary member comprises an axis of rotation concentric with an axis of rotation of said rotary output shaft, and
    wherein said crank rod extends perpendicular to said axis of rotation of said rotary member; and said crank rod is operatively, pivotally connected eccentrically to said axis of rotation of said rotary member, said crank rod pivotally connected at an opposite end to said knockout frame.

13. The improvement according to claim 12, comprising a housing configured for containing an oil bath, said crank rod located within said housing.

14. The improvement according to claim 13, wherein said housing comprises a top wail and a sleeve that sealingly penetrates through said top wall, said sleeve fixed to a top end of said crank rod to reciprocate with said crank rod.

15. The improvement according to claim 13, wherein said rotary member comprises a crank hub; said crank hub fixed to said output shaft to rotate therewith, said crank rod pivotally connected to said crank hub.

16. The improvement according to claim 15, comprising a roller bearing carried by said housing, wherein said crank hub is journaled for rotation by said roller bearing.

17. The improvement according to claim 12, wherein said frame comprises a beam and two knockout rods fixed to said beam, and a knockout support fixed to said knockout rods, said knockout support carrying said knockout plungers.

18. The improvement according to claim 17, wherein said beam comprises a yoke and said crank rod comprises a distal apertured end portion pinned to said yoke.

19. The improvement according to claim 18, comprising a crank hub fixed to said output shaft to rotate therewith, said crank rod pivotally connected to said crank hub; and a housing configured for containing an oil bath, said crank rod and said crank hub located within said housing, wherein said knockout rods are guided for linear movement by penetrating through walls of said housing.

20. The improvement according to claim 10, comprising a frame carrying said knockout plungers, and wherein said rotary member comprises an axis of rotation concentric with an axis of rotation of said rotary output shaft, and wherein said crank rod extends perpendicular to said axis of rotation of said rotary member, and said crank rod is operatively, pivotally connected eccentrically to said axis of rotation of said rotary member, said crank rod pivotally connected at an opposite end to said knockout frame; and a crank hub fixed to said output shaft to rotate therewith, said crank rod pivotally connected to said crank hub and wherein said crank rod is pivotally connected to said crank hub by a pin and a roller bearing surrounding said pin, said crank rod having a base annular end surrounding said roller bearing.

21. Tooling for a knockout drive of a reciprocating mold plate patty-forming machine, the patty-forming machine having a mold plate drive for reciprocating the mold plate, comprising:

an electric motor mechanically independent of the mold plate drive, said electric motor adjustable in speed independent of speed of the mold plate, said electric motor having a rotary output shaft controllable in rotary movement independent of the movement of the mold plate drive;

a rotary-to-linear motion apparatus comprising a crank rod eccentrically connected to a rotary member; said rotary member operatively connected to said rotary output shaft of said electric motor; and at least one knockout member operatively connected to said rotary-to-linear motion apparatus, said knockout member connectable to a knockout plunger to reciprocate said knockout plunger.

22. The tooling according to claim 21, wherein said electric motor comprises a precise position controlled motor.

23. The tooling according to claim 21, comprising a knockout frame configured to carry a plurality of knockout plungers, and wherein said rotary member comprises an axis of rotation concentric with an axis of rotation of said rotary output shaft, and wherein said crank rod extends perpendicular to said axis of rotation of said rotary member, and said crank rod is operatively, pivotally connected eccentrically to said axis of rotation of said rotary member, said crank rod pivotally connected at an opposite end to said knockout frame.

24. The tooling according to claim 23, comprising a housing configured for containing an oil bath, said crank rod located within said housing.

25. The tooling according to claim 24, wherein said housing comprises a top wall and a sleeve that sealingly penetrates through said top wall, said sleeve fixed to a top end of said crank rod to reciprocate with said crank rod.

26. The tooling according to claim 24, wherein said rotary member comprises a crank hub; said crank hub fixed to said output shaft to rotate therewith, said crank rod pivotally connected to said crank hub.

27. The tooling according to claim 26, comprising a roller bearing carried by said housing, wherein said crank hub is journaled for rotation by said roller bearing.

28. The tooling according to claim 21, wherein said at least one knockout member comprises a beam and two knockout rods fixed to said beam, and a knockout support fixed to said knockout rods, said knockout support configured to carry a plurality of knockout plungers.

29. Tooling for a knockout drive of a reciprocating mold plate patty-forming machine, the patty-forming machine having a mold plate drive for reciprocating the mold plate, comprising:

an electric motor mechanically independent of the mold plate drive, said electric motor adjustable in speed independent of speed of the mold plate, said electric motor having a rotary output shaft controllable in rotary movement independent of the movement of the mold plate drive;

a rotary-to-linear motion apparatus operatively connected to said rotary output shaft of said electric motor; and at least one knockout member operatively connected to said rotary-to-linear motion apparatus, said knockout member connectable to a knockout plunger to reciprocate said knockout plunger, said knockout member having at least one knockout rod operatively connected to at least one said knockout plunger; and, a housing configured as an oil reservoir, said rotary-to-linear motion apparatus located within said oil reservoir, wherein said at least one knockout rod guided for linear movement by penetrating through walls of said housing.

30. A patty forming apparatus, comprising:

a reciprocating mold plate having mold cavities;

a mold plate drive for reciprocating said mold plate between a cavity fill position and a patty discharge position;

a food product feed for delivering pressurized food product into said cavities at said fill position;

a plurality of knockout plungers corresponding in number to said cavities, said plungers arranged above said mold cavities when said mold plate is in said patty discharge position;

a precise position controlled motor having a rotary output shaft controllable in rotary movement independent of the movement of the mold plate drive;

a rotary-to-linear motion conversion device operatively connected to said rotary output shaft and to said plurality of knockout plungers, said rotary-to-linear motion conversion device receiving rotary power from said rotary output shaft and driving said plurality of plungers into said mold cavities to discharge patties from said mold cavities, said rotary-to-linear motion device comprises a crank rod eccentrically connected to a rotary member; said rotary member operatively connected to said rotary output shaft of said precise position controlled motor.

31. The apparatus according to claim 30, wherein said precise position controlled motor comprises a servomotor.

32. The apparatus according to claim 30, comprising a frame carrying said knockout plungers, and wherein said rotary member comprises an axis of rotation concentric with an axis of rotation of said rotary output shaft, and wherein said crank rod extends perpendicular to said axis of rotation of said rotary member, and said crank rod is operatively, pivotally connected eccentrically to said axis of rotation of said rotary member, said crank rod pivotally connected at an opposite end to said knockout frame.

33. The apparatus according to claim 32, comprising a housing configured for containing an oil bath, said crank rod located within said housing.

34. The apparatus according to claim 33, wherein said housing comprises a top wall and a sleeve that sealingly penetrates through said top wall, said sleeve fixed to a top end of said crank rod to reciprocate with said crank rod.

35. The apparatus according to claim 32, comprising a crank hub fixed to said output shaft to rotate therewith, said crank rod pivotally connected to said crank hub.

36. The improvement according to claim 1, wherein said rotary-to-linear motion apparatus, said electric motor, and said at least one knockout member are adjustable together in longitudinal position.

37. The knock-out drive according to claim 9, wherein said at least one knockout member comprises a beam and a knockout support; said at least one knockout rod comprises two knockout rods; said knockout rods fixed to said beam, and said knockout support fixed to said knockout rods, said knockout support carrying said knockout plungers.

38. The tooling according to claim 29, wherein said at least one knockout member comprises a beam and a knockout support; said at least one knockout rod comprises two knockout rods; said two knockout rods fixed to said beam, and said knockout support fixed to said knockout rods, said knockout support configured to carry a plurality of knockout plungers.

* * * * *